N. C. DUNN.
SAND UNLOADING DEVICE.
APPLICATION FILED APR. 12, 1918.
1,374,068.
Patented Apr. 5, 1921.
2 SHEETS—SHEET 1.
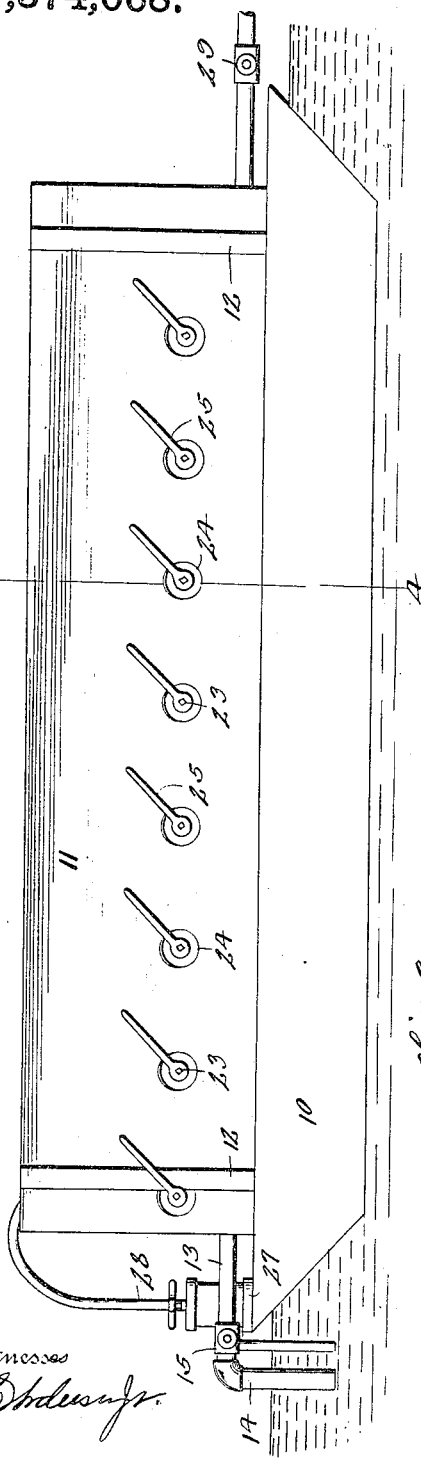
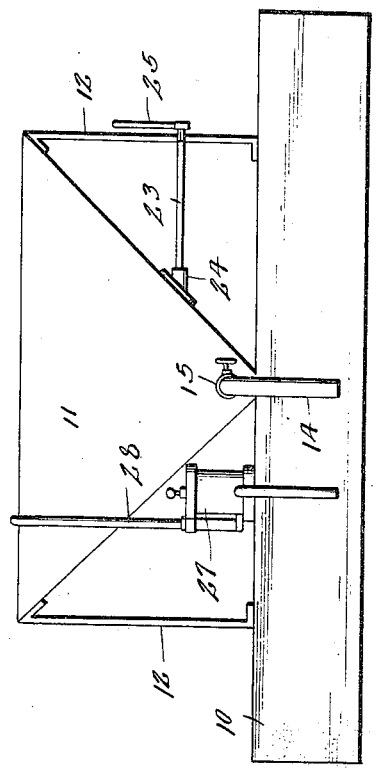
Inventor
N. C. Dunn,
By Victor J. Evans
Attorney N. C. DUNN.
SAND UNLOADING DEVICE.
APPLICATION FILED APR. 12, 1918.
1,374,068.
Patented Apr. 5, 1921.
2 SHEETS—SHEET 2.
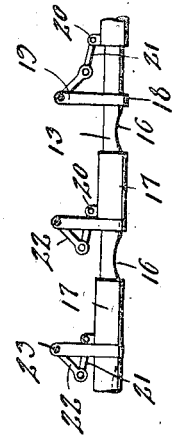
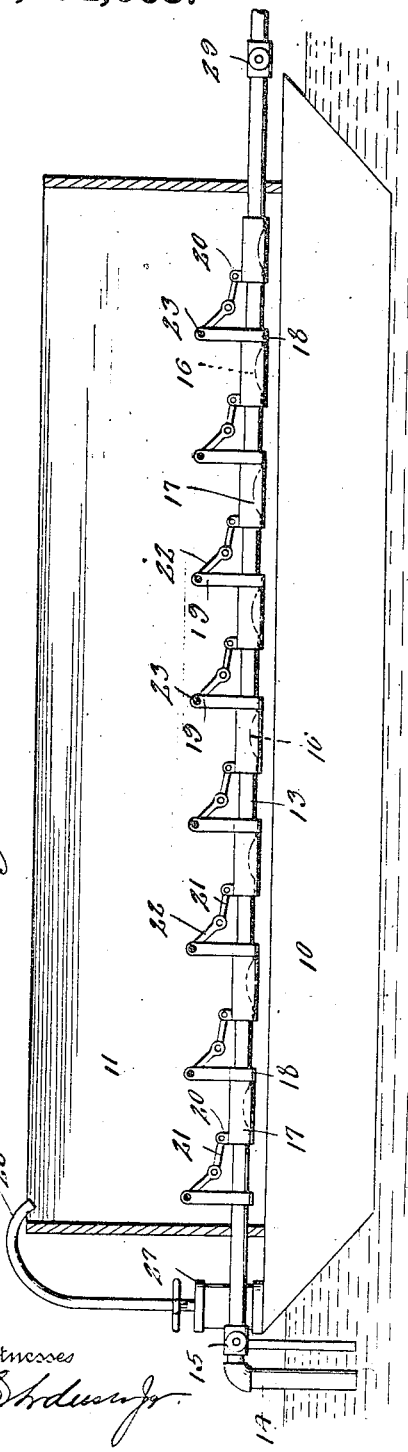
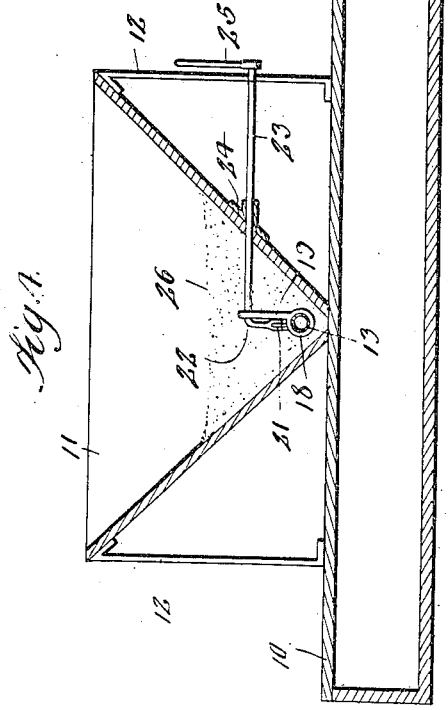
Inventor
N. C. Dunn,
By Victor J. Evans
Attorney

UNITED STATES PATENT OFFICE.

NOBLE C. DUNN, OF LITTLE ROCK, ARKANSAS.

SAND-UNLOADING DEVICE.

1,374,068.   Specification of Letters Patent.   Patented Apr. 5, 1921.

Application filed April 12, 1918. Serial No. 228,285.

*To all whom it may concern:*

Be it known that I, NOBLE C. DUNN, a citizen of the United States, residing at Little Rock, in the county of Pulaski and State of Arkansas, have invented new and useful Improvements in Sand-Unloading Devices, of which the following is a specification.

This invention relates to an improved unloading device for suction dredges, and resides in the novel construction, combination, and operative arrangement of parts set forth in the following description and falling within the scope of what is claimed.

In the accompanying drawings,

Figure 1 is a side view of the improvement.

Fig. 2 is an end view of the same.

Fig. 3 is a sectional view approximately on the line 3—3 of Fig. 2.

Fig. 4 is a transverse sectional view approximately on the line 4—4 of Fig. 1.

Fig. 5 is a detail elevation illustrating the valves in their open position.

The primary object of the present invention is to produce a means for unloading sand, gravel, and other material in a uniform manner and wherein the discharge pipe is so constructed and arranged as to prevent the choking thereof.

The device also contemplates a construction and arrangement whereby water will at all times be arranged above the discharge pipe to prevent the entrance of air through openings therein, so that the suction from a pump connected with the pipe will positively act upon the sand or other material which is gravitationally fed to the openings in the bottom of the pipe, and the said openings being controlled by suitable valves whereby the same may be partly or wholly covered in accordance with the grade of sand or other substance operated upon, as well as when the device is not in use.

As disclosed by the drawings I employ a barge 10 upon which is longitudinally arranged a bin 11. The bin is substantially V-shaped in cross section and suitable braces 12 are provided between the said bin and the barge to stabilize the bin. Passing entirely through the bin, adjacent to the lower or bottom portion thereof is a pipe 13, one of the ends of the pipe having a downward angle branch 14 directed into the water on which the barge 10 floats, and between this angle end and the bin 11 the pipe is provided with a hand controlled valve 15. The opposite end of the pipe is connected with a suction pump (not shown).

The pipe 13, upon the lower surfaces thereof is provided with spaced openings 16 forming inlets to the pipe, and these inlet openings are each controlled by a valve 17.

The valves are each in the nature of a short tube positioned for slidable movement on the pipe 13. Secured on the pipe 13, at desired spaced intervals are collars 18 having each an upstanding arm 19. On each of the valves 17, adjacent one of the ends thereof is a lug 20. Pivotally secured to each of the lugs 20 is the bifurcated end of a link 21. Pivotally secured to the free end of each of the links 21 is the bifurcated end of the crank portion 22 of a shaft 23, each of the said shafts passing through a bearing opening in the respective arms 19. The shafts 23 pass through suitable bushings 24 in one side of the bin, the latter providing a bearing for the shaft, and the outer end of each of the shafts has secured thereon an angle lever 25.

The pipe 13, as stated, is disposed a slight distance above the lower portion or apex of the cross sectional V-shaped bin 11, and the sand or other substance 26 in the bin will gravitate along the inclined sides of the bin to cover the pipe 13 as long as sufficient material is in the bin for this purpose.

The suction pump may have connected therewith a branch pipe which may have its ends flexible and provided with a nozzle so that the water can be turned into the bin over the sand, but preferably, and as shown by the drawings, an auxiliary pump 27 may be employed. This pump draws the water from the stream in which the barge floats and is provided with a flexible or other pipe 28 arranged over the bin to deliver water to the sand in the bin.

A valve 29 is arranged on the suction pipe near the suction pump and this valve is opened before the pump is actuated. Also before the pump is actuated a sufficient quantity of water is let in the bin to entirely cover the pipe 13. The suction pipe is then brought into operation. The water in the bin prevents the entrance of air in the pipe 13 through the openings 16, and it will be noted that both a suction action by the pump and a gravity action by the sand causes the latter to be delivered through the openings 16 in the pipe and the sand to be drawn from the bin through the pipe. The valve 15, is usually partially open during the unloading operation, and both the valves 15 and 22 are closed when the device is inactive.

It is not at all necessary that the engagement between the valves and the pipe be water-tight, but it is necessary that sufficient water be let into the bin to provide a seal between the ports 16 of the valve and the pipe 13. A plurality of independently operated valves 17 are employed, in lieu of a single valve on the pipe 13, because the sand or other material will not, as a rule gravitate evenly to the bottom of the bin and sufficient suction might not be exerted by the pump for drawing the sand through all of the openings or ports in the pipe, should all of the latter be uncovered. Again with the solid matter removed from above certain of the openings or ports in the pipe it is a difficult matter to provide the proper water seal, as the pump will draw out the water in greater proportion than the sand is sucked through the pipe. The independent operating means for each of the valves permits of the openings in the pipe being partially or fully uncovered, in accordance with the matter acted on, so that certain of the parts, acting upon say gravel or hardened substances in the sand may be wholly opened, and certain others, through which fine sand is flowing only partially uncovered, so that danger of choking the pipes by hardened materials may be effectively overcome. It is believed, from the foregoing the simplicity and advantages of the construction will be apparent without further description.

Having thus described the invention, what I claim is:

1. In a sand unloading device, a bin having its sides inclined inwardly from the top to the bottom thereof, a suction pipe arranged longitudinally in the bottom of the bin and passing therethrough, in combination with a pump for the suction pipe and a means for partly flooding the bin to arrange the suction pipe therebelow; of sleeves comprising tubular valves arranged on the suction pipe, and means for sliding the tubes longitudinally to cover respectively the openings in the suction pipe.

2. In a sand unloading device, the combination with a floating barge, having a bin thereon, the side walls of which being inclined inwardly to the bottom thereof, a suction pipe extending longitudinally through the bin, said pipe having its bottom provided with spaced elongated openings, and means for partly flooding the bin to cover the pipe, of a valve for controlling each of the openings, each of said valves comprising a tube arranged on the said suction pipe, means arranged to one side of the bin and barge for sliding said valves to partially or wholly cover or uncover the openings, and means for limiting the sliding movement of said valves in both directions.

3. In a sand unloading device, the combination with a bin which is substantially V-shaped in cross section and which receives sand therein, a suction pipe arranged centrally of the bin extending longitudinally therethrough and disposed a slight distance above the bottom thereof, said suction pipe having spaced elongated openings at the bottom thereof, and means for partly flooding the bin to cover the suction pipe, of a slidable valve comprising a tube arranged on the pipe for each of the openings, means for limiting the movement of the valves in both directions, an operating shaft for each of the valves disposed laterally of the bin and a handle for each of the shafts arranged exteriorly of the bin.

4. In a sand unloading device, the combination with a bin which is substantially V-shaped in cross section, a longitudinally arranged suction pipe extending centrally of the bin and positioned a slight distance above the bottom thereof, said suction pipe having its bottom provided with spaced openings, and means for partly flooding the bin to cover the pipe, of a valve for controlling each of the openings, each of said valves comprising a tube arranged for slidable movement on the suction pipe, upstanding arms on the pipe opposite the openings, a link pivoted to each of the valves, horizontally disposed laterally extending shafts journaled in the sides of the bin and in the respective arms having a cranked end which is pivotally connected to the respective links, and an operating handle on the outer end of each of the shafts.

In testimony whereof I affix my signature.

NOBLE C. DUNN.